United States Patent [19]
Perkins et al.

[11] Patent Number: 5,959,770
[45] Date of Patent: Sep. 28, 1999

[54] TELESCOPE ZOOM LENS ASSEMBLY

[75] Inventors: William C. Perkins, Lenexa, Kans.; Hiroshi Yoda, Tokyo, Japan

[73] Assignee: Bushnell Corporation, Overland Park, Kans.

[21] Appl. No.: 09/090,287

[22] Filed: Jun. 4, 1998

[51] Int. Cl.⁶ .......................... G02B 23/00; G02B 15/14; G02B 7/02
[52] U.S. Cl. .......................... 359/422; 359/699; 359/827
[58] Field of Search .................................. 359/380, 421, 359/422, 425, 426, 423, 432, 399, 699, 700, 827

[56] References Cited

U.S. PATENT DOCUMENTS

| | | | |
|---|---|---|---|
| 2,662,443 | 12/1953 | Loeck | 359/422 |
| 3,549,230 | 12/1970 | Kato | 359/380 |
| 4,172,634 | 10/1979 | Thompson | 359/699 |
| 4,221,459 | 9/1980 | Fisher | 359/364 |
| 4,249,793 | 2/1981 | Uehara | 359/422 |
| 4,600,277 | 7/1986 | Murray, Jr. | 359/423 |
| 5,151,820 | 9/1992 | Sillitto et al. | 359/354 |
| 5,587,843 | 12/1996 | Chen | 359/700 |
| 5,598,296 | 1/1997 | Imaizumi | 359/421 |

*Primary Examiner*—Cassandra Spyrou
*Assistant Examiner*—Mark A. Robinson
*Attorney, Agent, or Firm*—Litman, Kraai & Brown L.L.C.; John C. McMahon

[57] ABSTRACT

A penta mirror diagonal and zoom lens assembly for refracting or catadioptric astronomical telescopes includes a specially adapted zoom lens with a key extending outward from an objective lens and an adaptor designed for insertion and retention in a viewing end of an astronomical or catadioptric telescope. The adaptor includes a keyway which mates with the key on the zoom lens, thus allowing the zoom lens to be used only with the adaptor. The zoom lens itself is specially designed for use with astronomical or catadioptric telescopes.

12 Claims, 4 Drawing Sheets

TELESCOPE ZOOM LENS ASSEMBLY

FIELD OF THE INVENTION

The present invention relates to a telescope zoom lens assembly, and, more particularly, to such a zoom lens assembly which is especially adapted for use with astronomical or catadioptric telescopes. The zoom lens has a special objective barrel with a key which limits the zoom lens to use with a special adaptor with a mating keyway.

BACKGROUND OF THE INVENTION

Astronomical telescopes are becoming ever more popular with consumers as their prices have come down. Quality astronomical telescopes are now widely available at fairly reasonable costs. This has created a large number of inexperienced users of astronomical telescopes. Typical consumer-marketed refracting astronomical telescopes, when they are pointed at a celestial target, have the viewing end of their focusing tube positioned at an angle which would require a user to kneel or lie down and look up into an ocular lens positioned therein. It is common, therefore, for such telescopes to come equipped with a prismatic "diagonal" which redirects the image path 90 degrees so that a user can stand comfortably and look downward into an ocular lens.

The image presented through a refracting astronomical telescope with attached diagonal is reversed left to right. In order to correct the image for viewing, it is common to provide an elongate erecting lens between the ocular lens and the focusing tube. Furthermore, it is common to use an elongate barlow lens between the ocular lens and the focusing tube to multiply the magnification of the image provided by the telescope. When such elongate auxiliary lenses are used with a telescope, then a diagonal becomes absolutely necessary to avoid requiring a user to actually lie down to view the ocular lens. A problem with most diagonals is that they reverse the viewed image from right to left. For an inexperienced user, this presents a problem since spotting and tracking an astronomical object is non-intuitive. For example, when viewing the planet Jupiter, if an observer wanted to view the moons to the left of Jupiter, as the telescope is moved to the left, the viewed image appears to move to the right.

Another common practice with astronomical telescopes is the provision of multiple ocular lenses of differing focal lengths so that the effective magnification of the telescope is changed by changing ocular lenses. This presents a problem with manufacturers and retailers of such telescopes since the ocular lenses are small and can be easily removed and stolen from demonstration models or easily misplaced or lost by consumers. With advances in optical design and manufacturing, zoom lenses have become more affordable and are common in photography applications and terrestrial viewing devices such as binoculars. While a zoom lens with a refracting or catadioptric astronomical telescope would be a convenient and handy accessory, potentially replacing multiple ocular lenses, zoom lenses are not used with typical refracting or catadioptric telescopes due to the fact that compound lens systems such as are found in a zoom lens significantly reduce the amount of light reaching a user. Common diagonals also reduce the total light transmitted therethrough, so the light penalty associated with the combined diagonal and zoom lens is too great for practical viewing.

It is clear, then, that a need exists for an optical system which allows a user to conveniently view a refracting or catadioptric astronomical telescope from a standing position without affecting the left-right orientation of the image. Such a system should allow the reliable use of a zoom lens with a refracting or catadioptric astronomical telescope.

SUMMARY OF THE INVENTION

The present invention is directed to a penta mirror diagonal and zoom lens assembly for refracting or catadioptric astronomical telescopes. The assembly includes a penta mirror diagonal which performs the same function as a common diagonal, i.e. redirecting the path of the image by 90 degrees. The penta mirror diagonal, unlike common diagonals, is formed by two highly polished mirrors and is thus very efficient at transmitting light therethrough. Furthermore, unlike ordinary diagonals which reverse an image, due to the cumulative effect of the two mirrors it also presents an image at the viewing end which is identical in orientation to that at the objective end. The objective end of the penta mirror diagonal is sized to be inserted into the viewing end of a telescope focusing tube. The viewing end of the penta mirror diagonal extends at a 90 degree angle from the objective end thereof. A dual purpose adaptor, designed to allow the use of 0.965" format ocular lenses or a specially designed zoom lens with the penta mirror diagonal, is sized for insertion and retention in the viewing end of the penta mirror diagonal and the adaptor includes a peripheral keyway. The specially designed zoom lens includes a key sized and positioned to match the keyway in the adaptor. The size of the adaptor and the zoom lens barrel, along with the keyway in the adaptor and the key on the zoom lens prevents the zoom lens from being used with any telescope accessory other than the penta mirror diagonal equipped with the adaptor. Other elements usable with the inventive assembly include one or more ocular lenses, an erecting lens and a barlow lens, all of which are usable with the penta mirror diagonal.

OBJECTS AND ADVANTAGES OF THE INVENTION

The principal objects of the present invention include: providing a penta mirror diagonal and zoom lens assembly for a refracting or catadioptric astronomical telescope; providing such an assembly in which the penta mirror diagonal acts as a 90 degree diagonal with minimal light penalty and without altering the orientation of the image; providing such an assembly in which an adaptor insertable in the viewing end of the penta mirror diagonal is provided with a peripheral keyway which matches a key on an insertion end of a specially designed zoom lens; providing such an assembly in which the adaptor keyway and zoom lens key prevent the zoom lens from being used with other telescope accessories; providing such an assembly in which optional ocular lenses are also usable with the penta mirror diagonal; providing such an assembly with optional barlow and/or erecting lenses usable with the ocular lenses and the penta mirror diagonal but not with the zoom lens; providing such an assembly which provides the convenience of a zoom lens to a refracting or catadioptric astronomical telescope while avoiding the problems of the prior art; and providing such an assembly which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
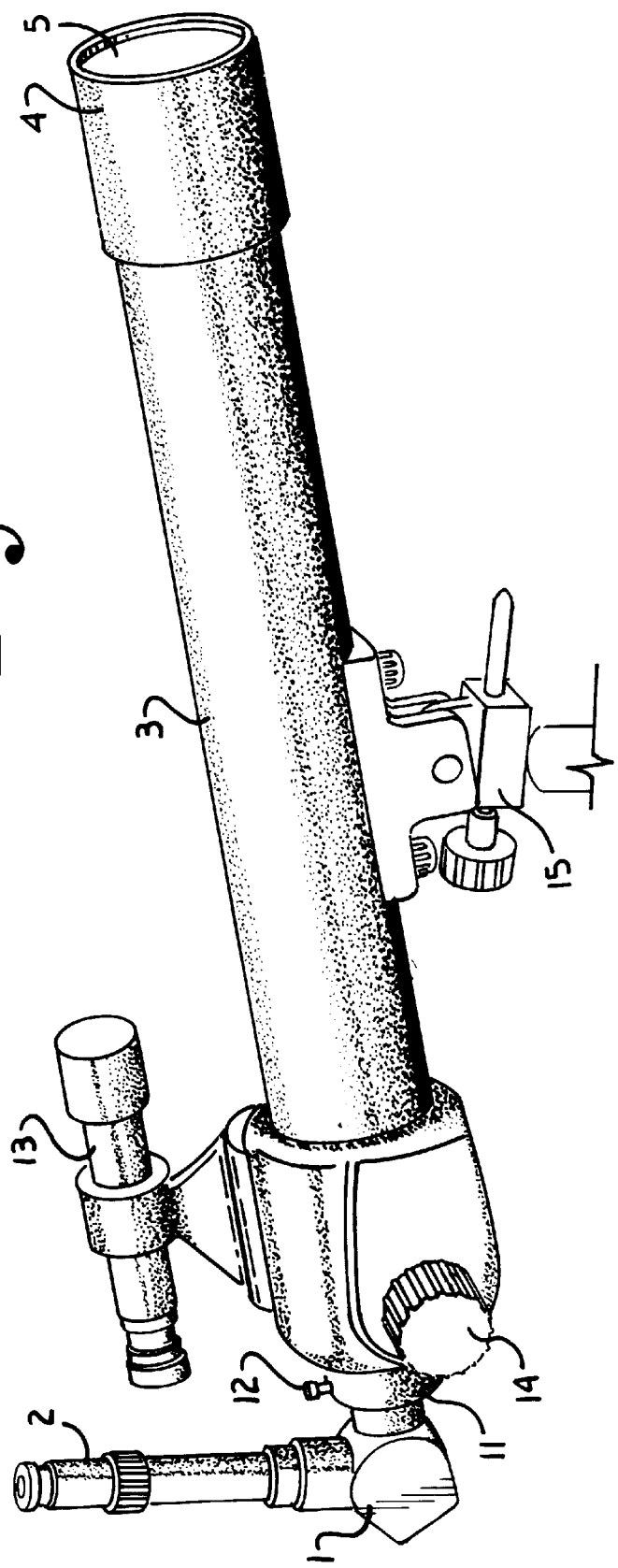
FIG. 1 is a perspective view of a refracting astronomical telescope with a penta mirror diagonal and zoom lens assembly in accordance with the present invention.
Figure 2:
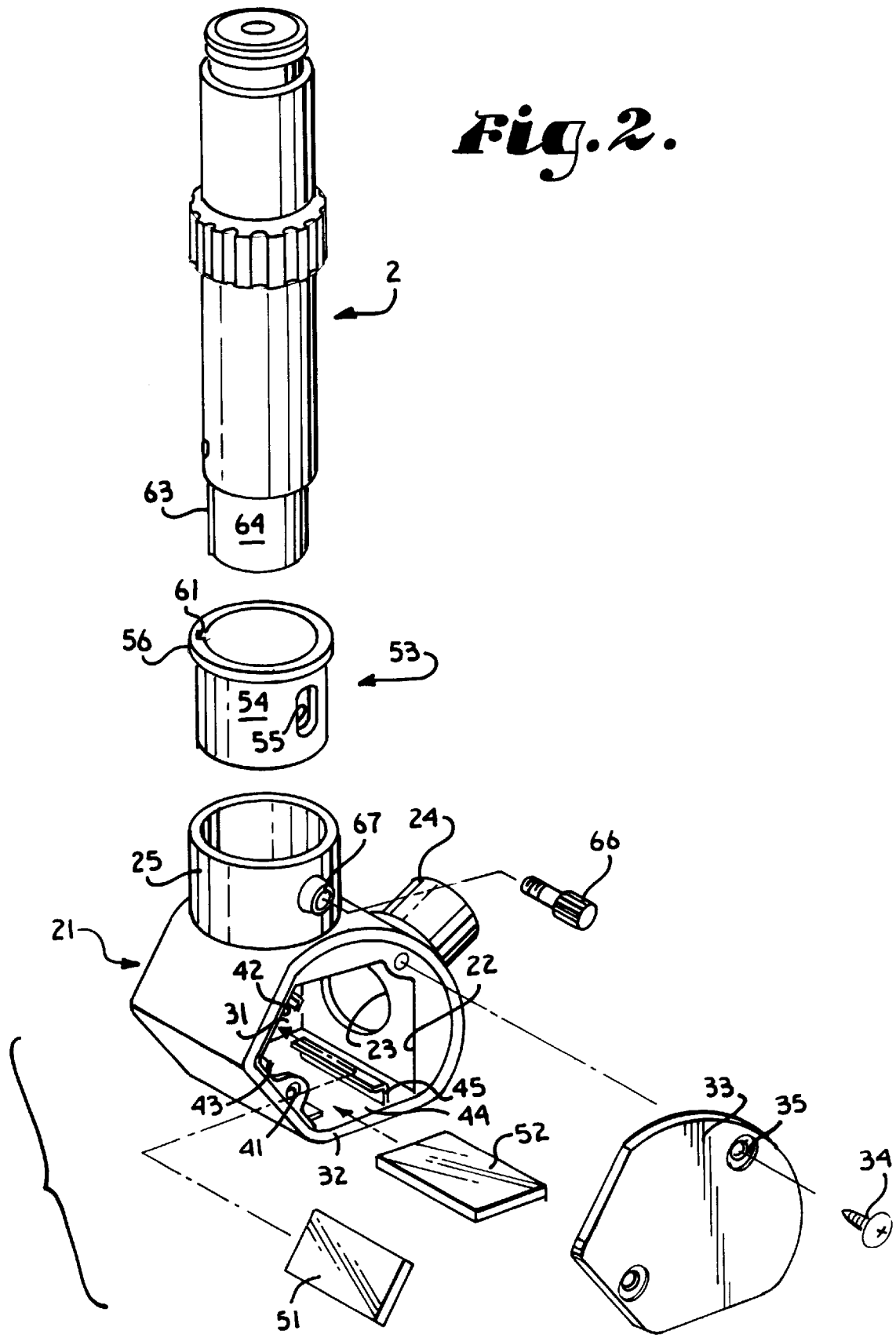
FIG. 2 is an enlarged perspective view of the zoom lens, adaptor and penta mirror diagonal of FIG. 1, with the penta mirror diagonal shown disassembled.

Referring to FIGS. 1–4, a penta mirror diagonal and zoom lens assembly is illustrated, with the penta mirror diagonal generally indicated at 1 and the zoom lens generally indicated at 2. FIG. 1 shows a refracting astronomical telescope focusing tube 3 with an objective end 4 pointing outward and incorporating an objective lens 5. A viewing end 6 of the focusing tube includes a cylindrical receptacle 11 with a set screw 12. The telescope focusing tube 3 includes other standard features such as a sighting scope 13, a focal adjustment knob 14 and an adjustable mount 15.

The penta mirror diagonal 1 includes a housing 21 (FIG. 2) with a mirror chamber 22 connecting via an objective aperture 23 to the interior of an objective tube 24 and via a viewing aperture (not shown) to the interior of a viewing tube 25. The viewing tube 25 and the objective tube 24 are oriented substantially orthogonally with respect to each other and the objective tube 24 is sized for insertion in a receiving aperture 26 in the focusing tube receptacle 11 (FIG. 3) where it is retained by the set screw 12 (FIG. 1). The mirror chamber 22 has a closed side 31 and an open side 32. A cover 33 is sized to encompass the open side 32 and a pair of threaded screws 34 are insertable through respective apertures 35 in the cover 33 end and into respective threaded receptacles 41 in the housing 21.

Within the mirror chamber 22, a first mirror receptacle 42 is formed by a first pair of opposed brackets 43 and a second mirror receptacle 44 is formed by a second pair of opposed brackets 45. An objective plate mirror 51 is positioned in the first mirror receptacle 42 at an orientation of substantially 22 and ½ degrees relative to the objective aperture 23 and a viewing plate mirror 52 is positioned in the second mirror receptacle 44 at an orientation substantially 45 degrees relative to the objective plate mirror 51. In operation, the objective mirror 51 receives light from the objective aperture 23 and reflects that light onto the surface of the viewing mirror 52. The viewing mirror 52 then reflects the light upward through the viewing aperture (not shown) and into the interior of the viewing tube 25.

A cylindrical adaptor 53 includes a barrel 54 sized for insertion and retention in the viewing tube 25 of the penta mirror diagonal 1. The adaptor 53 includes a slot 55 extending through the barrel 54, a peripheral ledge 56 above the barrel 54 and a keyway 61, each of which extend into the wall of the barrel 54 from an interior thereof. The specially designed zoom lens 2 includes a mating key 63 extending outward from an objective barrel 64 which key 63 is sized and positioned to match the keyway 61 in the adaptor 53. The key 63 on the zoom lens 2 prevents it from being used with any telescope accessory other than the penta mirror diagonal 1 equipped with the adaptor 53. A set screw 66, extends through a threaded bore 67 in the viewing tube 25 of the penta mirror diagonal 1 and through the slot 55 in the adaptor 53 to grip and retain the barrel 64 of the zoom lens 2.

Figure 4:
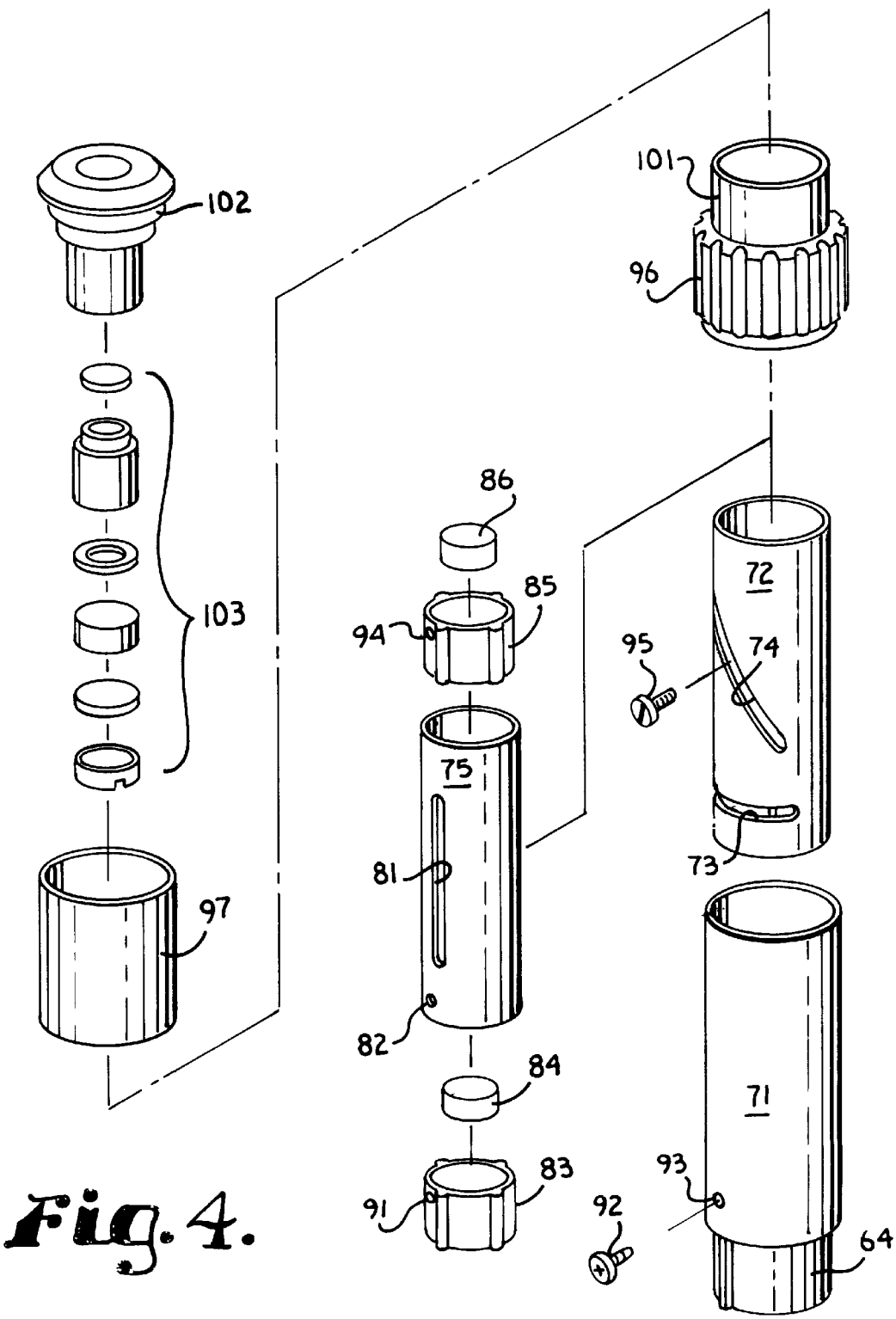
FIG. 4 is an enlarged, exploded view of the specialized zoom lens of FIGS. 1 and 2.

The zoom lens 62, shown exploded in FIG. 4, includes a cylindrical outer sleeve 71 attached to and extending upward from the objective barrel 64. The outer sleeve 71 is concentric with and with a larger diameter than the barrel 64. A first inner cylindrical sleeve 72 includes a horizontal slot 73 and a slanted slot 74. The first inner sleeve 72 is sized to fit within the outer sleeve 71. A second inner cylindrical sleeve 75 includes a vertical slot 81 and an aperture 82. The second inner sleeve 75 is sized to fit within the first inner sleeve 72. A fixed lens retaining block 83 is sized to fit within the second inner sleeve 75, with the block 83 holding a fixed lens 84. A movable lens retaining block 85 is also sized to fit within the second inner sleeve 75, with the block 85 holding a movable lens 86. The fixed retaining block 83 includes a threaded aperture 91 which is sized to receive a first screw 92 extending through an aperture 93 in the outer sleeve 71, then through the horizontal slot 73 in the first inner sleeve 72, through the aperture 82 in the second inner sleeve 75, and into the threaded aperture 91. The movable retaining block 85 includes a threaded aperture 94 which is sized to receive a second screw 95 extending through the slanted slot 74 in the first inner sleeve 72, through the vertical slot 81 in the second inner sleeve 75, and into the threaded aperture 94.

A knurled zooming knob 96 is attached to the first inner sleeve 72 such that turning the knob 96 also turns the first inner sleeve 72. An eyepiece receiving sleeve 97 is attached to an upper ring 101 of the knob 96 such that the sleeve 97 is rotatable with the knob 96. An eyepiece 102 with a compound viewing lens system 103 is inserted in the sleeve 97.

To operate the zoom lens 2, a viewer looks through the eyepiece 102 and grips the knob 96. By twisting the knob 96, the first inner sleeve 72 is rotated relative to both the outer sleeve 71 and the second inner sleeve 75. As the first inner sleeve 72 is rotated, the screw 94 is moved upward relative to the second inner sleeve 75 via the slanted slot 74 and the vertical slot 81. The movable lens retaining block 85 is also moved upward within the second inner sleeve 75, thus changing the distance between the fixed lens 84 and the movable lens 86. This changes the effective focal length, and, thus, the magnification power of the zoom lens 2.

Figure 3:
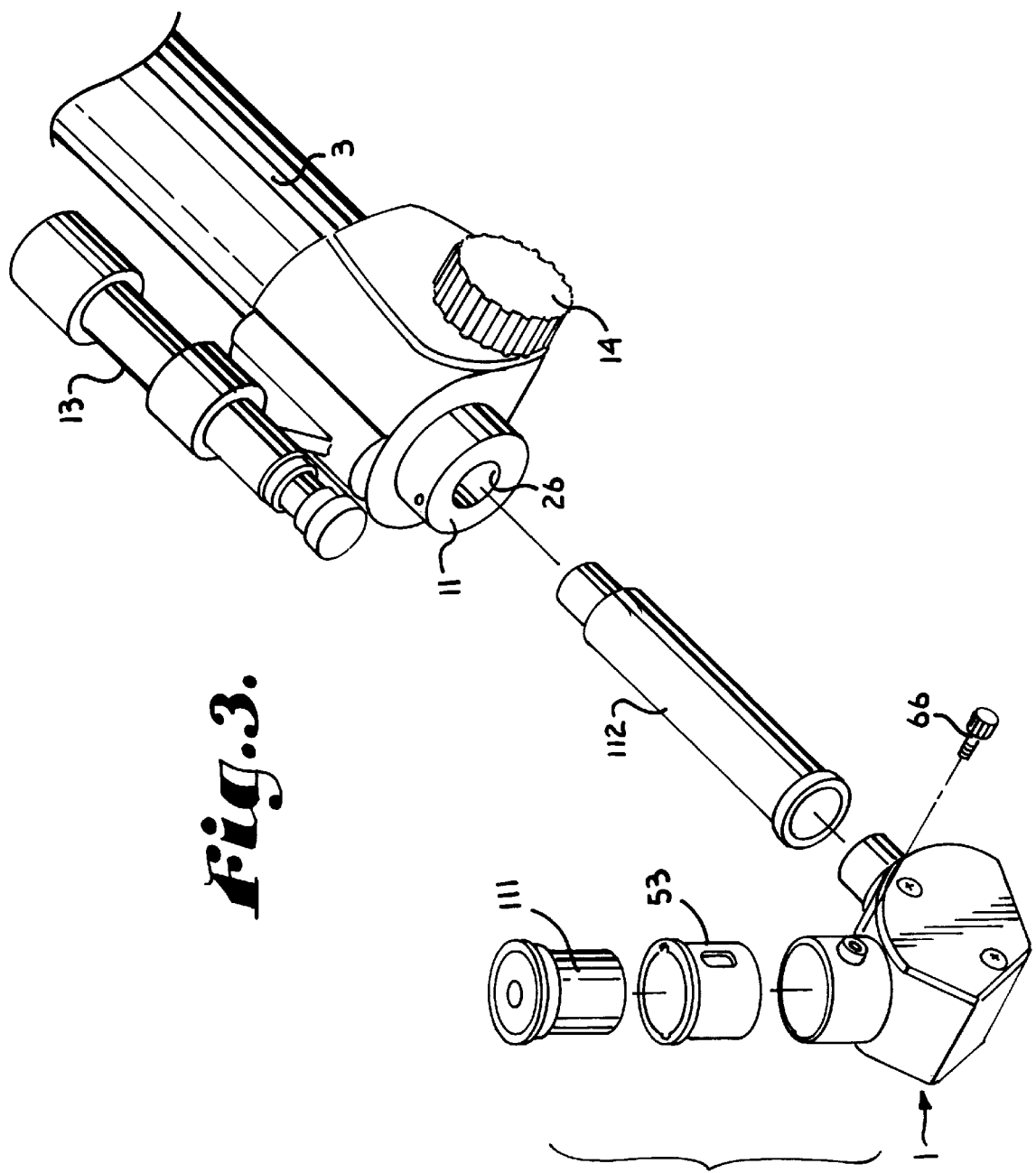
FIG. 3 is an enlarged, perspective view of the penta mirror diagonal and adaptor being used with a standard viewing ocular lens and with a barlow lens (or erecting lens) interposed between the penta mirror diagonal and the focusing tube of the telescope.

FIG. 3 illustrates other elements and arrangements of the inventive assembly, which can include one or more ocular lenses 111 usable with or without the penta mirror diagonal 1. The adaptor 53 also allows the 0.965" format ocular lens 111 to be used with the penta mirror diagonal 1. When a 1.25" format ocular lens is to be used (not shown), the adaptor 53 is removed from the penta mirror diagonal 1 and the larger ocular lens is inserted directly into the viewing tube 25 of the penta mirror diagonal 1. Additional compound lenses can be included, such as an erecting lens 112, as shown, or a barlow lens (not shown) usable with or without the penta mirror diagonal 1 but not in conjunction with the zoom lens 2. It is contemplated that the zoom lens 2 and adaptor 53 would be marketed as a unit along with instructions that the zoom lens 2 is to be used only with the penta mirror diagonal and not in conjunction with a barlow lens or erecting lens 112.

While the keyway 61 has been illustrated as incorporated into the adaptor 53 and the key 63 as incorporated into the zoom lens 2, they could be easily reversed and accomplish the same effect. Furthermore, while a single key 63 and keyway 61 have been shown, other numbers of keys and keyways, e.g. from 1 to 4 or more can be used as well. Other changes in detail will occur to those of ordinary skill in the art without affecting the viability of the invention. It is thus to be understood that while certain forms of the present invention have been illustrated and described herein, it is not to be limited to the specific forms or arrangement of parts described and shown.

We claim:

1. A zoom lens attachment for use with a refracting or catadioptric astronomical telescope, said attachment including a zoom lens, said zoom lens comprising:
   a. an objective barrel;
   b. a cylindrical outer sleeve attached to and extending upward from the objective barrel, said outer sleeve being concentric with and with a larger diameter than said barrel and having an aperture extending therethrough;
   c. a first inner cylindrical sleeve with a horizontal slot and a slanted slot, said first inner sleeve being sized to fit within the outer sleeve;
   d. a second inner cylindrical sleeve including a vertical slot and an aperture, said second inner sleeve being sized to fit within the first inner sleeve;
   e. a fixed lens retaining block sized to fit within the second inner sleeve, said fixed lens retaining block holding a fixed lens; and
   f. a movable lens retaining block which is also sized to fit within the second inner sleeve, said movable lens retaining block holding a movable lens.

2. A zoom lens attachment as in claim 1, and further comprising:
   a. a threaded aperture within said fixed lens retaining block which is sized to receive a first screw which extends through the horizontal slot in the first inner sleeve, through the aperture in the second inner sleeve and into said fixed lens retaining block threaded aperture.

3. A zoom lens attachment as in claim 2, and further comprising:
   a. a threaded aperture within said movable retaining block which is sized to receive a second screw extending through the slanted slot in the first inner sleeve, through the vertical slot in the second inner sleeve, and into the threaded aperture in said movable lens retaining block.

4. A zoom lens attachment as in claim 2, and further comprising:
   a. a knurled zooming knob attached to the first inner sleeve such that turning the zooming knob also turns the first inner sleeve.

5. A zoom lens attachment as in claim 2, and further comprising:
   a. an eyepiece receiving sleeve attached to said knob such that the sleeve is rotatable with the knob; and
   b. an eyepiece with a compound viewing lens system inserted in the eyepiece retaining sleeve.

6. A zoom lens attachment as in claim 1, and further comprising:
   a. an adaptor including a barrel with an inner diameter sized to receive said objective barrel of said zoom lens and an outer diameter sized to fit within an objective end of a diagonal, said barrel having a keyway formed in said inner diameter; and
   b. said zoom lens objective barrel has a key formed thereon which mates with said keyway in said adaptor barrel such that said zoom lens is usable with a telescope only in conjunction with said adaptor.

7. A zoom lens attachment for use with a refracting or catadioptric astronomical telescope, said attachment including a zoom lens and an adaptor:
   a. said zoom lens comprising:
      i. an objective barrel with a key formed thereon;
      ii. a cylindrical outer sleeve attached to and extending upward from the objective barrel, said outer sleeve being concentric with and with a larger diameter than said barrel and having an aperture extending therethrough;
      iii. a first inner cylindrical sleeve with a horizontal slot and a slanted slot, said first inner sleeve being sized to fit within the outer sleeve;
      iv. a second inner cylindrical sleeve including a vertical slot and an aperture, said second inner sleeve being sized to fit within the first inner sleeve;
      v. a fixed lens retaining block sized to fit within the second inner sleeve, said fixed lens retaining block holding a fixed lens;
      vi. a movable lens retaining block which is also sized to fit within the second inner sleeve, said movable lens retaining block holding a movable lens; and
   b. said adaptor comprising:
      i. a barrel with an inner diameter sized to receive said objective barrel of said zoom lens and an outer diameter sized to fit within an objective end of a diagonal, said barrel having a keyway formed in said inner diameter which mates with said key in said zoom lens objective barrel such that said zoom lens is usable with a telescope only in conjunction with said adaptor.

8. A zoom lens attachment as in claim 7, and further comprising:
   a. a threaded aperture within said fixed lens retaining block which is sized to receive a first screw which extends through the horizontal slot in the first inner sleeve, through the aperture in the second inner sleeve and into said fixed lens retaining block threaded aperture.

9. A zoom lens attachment as in claim 8, and further comprising:
   a. a threaded aperture within said movable retaining block which is sized to receive a second screw extending through the slanted slot in the first inner sleeve, through the vertical slot in the second inner sleeve, and into the threaded aperture in said movable lens retaining block.

10. A zoom lens attachment as in claim 8, and further comprising:
    a. a knurled zooming knob attached to the first inner sleeve such that turning the zooming knob also turns the first inner sleeve.

11. A zoom lens attachment as in claim 8, and further comprising:
   a. an eyepiece receiving sleeve attached to said knob such that the sleeve is rotatable with the knob; and
   b. an eyepiece with a compound viewing lens system inserted in the eyepiece retaining sleeve.

12. A zoom lens attachment for use with a refracting or catadioptric telescope, said attachment including a zoom lens and an adaptor:
   a. said zoom lens comprising:
      i. an objective barrel with a key extending outward therefrom;
      ii. a fixed lens;
      iii. a movable lens;
      iv. structure which is selectively operable to move said movable lens relative to said fixed lens to change the magnification of said zoom lens; and
   b. said attachment comprising:
      i. an adaptor including a barrel with an inner diameter sized to receive said objective barrel of said zoom lens and an outer diameter sized to fit within an objective end of a diagonal, said barrel having a keyway formed in said inner diameter which mates with said key in said zoom lens objective barrel such that said zoom lens is usable with a telescope only in conjunction with said adaptor.

\* \* \* \* \*